(12) United States Patent
Goodenough

(10) Patent No.: US 6,939,066 B2
(45) Date of Patent: Sep. 6, 2005

(54) HAND-HELD, FREESTANDING, DOUBLE-SIDED ELECTRONIC KEYBOARD

(76) Inventor: Gary Lee Goodenough, 478 Carlton Ave., Apt. 3, Brooklyn, NY (US) 11238

( * ) Notice: Subject to any disclaimer, the term of this patent is extended or adjusted under 35 U.S.C. 154(b) by 500 days.

(21) Appl. No.: 10/123,824

(22) Filed: Apr. 16, 2002

(65) Prior Publication Data
US 2003/0193477 A1 Oct. 16, 2003

(51) Int. Cl.[7] .................................................. B41J 5/08
(52) U.S. Cl. ....................... 400/477; 400/472; 400/480; 200/5 A; 200/5 B
(58) Field of Search ................................. 400/489, 488, 400/486, 477, 480, 472; 341/22; 200/5 A, 5 B, 5 C

(56) References Cited

U.S. PATENT DOCUMENTS

| 5,410,333 A | * | 4/1995 | Conway ..................... 345/169 |
| 6,070,068 A | * | 5/2000 | Sudo ........................ 455/414.1 |
| 6,288,709 B1 | * | 9/2001 | Willner et al. ............. 345/169 |
| 6,297,752 B1 | * | 10/2001 | Ni ............................... 341/22 |
| 6,370,018 B1 | * | 4/2002 | Miller et al. ................ 361/680 |
| 6,512,511 B2 | * | 1/2003 | Willner et al. .............. 345/169 |
| 6,547,463 B1 | * | 4/2003 | Loo ........................... 400/472 |
| 6,580,421 B1 | * | 6/2003 | Leman ....................... 345/168 |
| 6,738,770 B2 | * | 5/2004 | Gorman ......................... 707/7 |
| 6,747,635 B2 | * | 6/2004 | Ossia ......................... 345/169 |

* cited by examiner

Primary Examiner—Andrew H. Hirshfeld
Assistant Examiner—Dave A. Ghatt

(57) ABSTRACT

This invention is a keyboard apparatus with front and back key functionality. The body of the apparatus is held in the hands, supported by the palms. This leaves both of the thumbs and all of the fingers free to operate the key functionality, while the apparatus is being held. Key functionality installed on the back is operated by the fingers; key functionality installed on the front is operated by the thumbs. When properly configured, the user may perform full touch-typing techniques while holding the apparatus. This configuration may reduce stress on the hands. Modifier keys are shaped, grouped and positioned so they may be operated by one thumb. Algorithms provide keyboard lock function and aid the user in locating the home row of keys needed for touch-typing.

1 Claim, 6 Drawing Sheets

HAND-HELD, FREESTANDING, DOUBLE-SIDED ELECTRONIC KEYBOARD

BACKGROUND OF THE INVENTION

1. Field

This invention relates to apparatus and methods of keyboard functionality such as found within data-processing, communications, and computer systems or any devices employing keyboard functionality, and specifically addresses apparatus and methods whereby the user may use the thumbs, and all of the fingers of both hands, while the apparatus is held in the users hands.

2. State of the Art

The use of keyboards has become ubiquitous in business and consumer products. Early mechanical and electrical inventions, such as the typewriter, Teletype, and typesetting machine, as well as devices with numeric keypads, have evolved and culminated in standards for the type of electronic keyboard in common use today.

This type of keyboard is employed, along with various other electronic technologies, to perform numerous keyboard functions. These include such alphanumeric applications as word processing, typesetting and data-entry. And, as computers become more powerful, the keyboard may also perform various control functions within such applications as video and music editing.

With the advance of computer technology, more products are beginning to have digital features requiring advanced keyboard functionality. Devices such as electronic signs, cell telephones, or multiple-capacity CD players with text features, are being given small, nonstandard keyboards. Even the clipboard carried by delivery persons now has data processing and communication operations that require keyboard functionality. And, as the trend towards portable digital devices increases, the need for small handheld keyboards is growing.

The most common installation of an electronic keyboard is within a personal computer system. Like most types of keyboards, these are constructed with a flat arrangement of the keys, in a frame that requires a supporting surface or structure in order to be used effectively. A desk, table or specialized computer furniture is required for a desktop computer or terminal. Devices that are intended to be portable, cannot be used without setting them down (on the user's knees, in the case of a portable or laptop computer), or holding them in one hand and attempting to type with the other hand.

One feature of the standard flat keyboard that has helped make it so successful is the touch-typing system. This system places the keys in a standardized arrangement that permits most of the keys to be reached from a fixed location called the home row of keys. Once the user has learned the proper fingering, rapid efficient typing can proceed without the need to look at the hands. The QWERTY and Dvorak layouts are two commonly implemented standards. There are also standards for the physical characteristics of the keys that promote touch typing, such as ANSI standard HFS 100-1988 which specifies the size and spacing of the key caps.

Although the touch-typing system is fast and efficient, using a standard flat keyboard places the user in a fixed posture that may contribute to the chronic injury known as repetitive stress disorder. Some hybrid designs have added rotating or swiveling sections to the flat layout for a more natural position of the hands. Although useful, these developments do not lend themselves to portable or fully hand-held devices.

The basic operation of an electronic keyboard consists of pressing of each key individually. Additional functions are invoked by the use of modifier keys, such as the shift key on an alphanumeric keyboard. This key provides capital letters and additional characters when pressed in conjunction with another key. There are other types of modifier keys employed by digital systems, such as Command, Control, Alt and Option. These keys would be pressed in various combinations, along with a letter or number key, in order to issue commands to the operating system or application.

Except for the standard shift key, it is not usually possible to use the modifier keys while touch-typing. It is necessary to lift one or both hands away from the home position in order to press the desired "chord" of keys.

The implementation of key functionality is typically by key switches connected to electronic circuitry. Additional standard and proprietary hardware and software detects the keys as they are pressed, and interprets their purpose. Other methods of implementing key functionality would include the use of touch screen technology to generate soft or virtual buttons. Such keys would be graphically represented, and their operation would be detected by the position of the user's fingertips on the screen.

Modem computer operating systems make use of graphical user interfaces that require a pointing device. These devices are frequently incorporated into the structure of the keyboard, particularly in portable systems. There are also additional keys needed to support system operations, such as cursor control keys, program function keys or special window or menu keys. These keys are also used outside the usual touch-typing system.

As more business and consumer products incorporate digital technology, many types of hybrid devices are becoming available. Cellular phones now transmit text messages; portable digital assistant devices can initiate telephone calls and send text as e-mail. Laptop computers are made with standard keyboards, but these other portable devices are being designed with small non-standard keyboards.

These small keyboards do not lend themselves to touch-typing. Most cell phones rely on the numeric touch pad, while other devices use small buttons that can only be operated by one finger or with the thumbs. New handwriting recognition systems allow the user to write text by hand on a touch screen. These systems are very slow and inefficient.

Future developments in digital technology may eventually supersede all keyboard functionality. However the value of the touch typing system, and the relative simplicity of electronic keyboard construction and use suggest that considerable advances would be required before these become obsolete.

BRIEF SUMMARY OF THE INVENTION

This invention is a device that is intended to provide an improvement to the implementation of keyboard functionality in any system that employs such functionality. The chief advantage to be found is the ability to use both of the thumbs, and all of the fingers, at the same time, while holding the device in the hands. In particular, when the device is properly configured, the user may hold the device and perform full touch-typing techniques without any other support being required. In addition, use of the device places the forearms; wrists and fingers in a linear position, which may help the user, avoid injuries that have been associated with prolonged keyboard use.

The body of the apparatus is of a shape and size that may be held and supported between the palms of the hands, leaving the fingers and thumbs free. Keyboard functionality is installed on the front and back of the apparatus, with the keys on the front (the side toward the user) being operated by the thumbs and the keys on the back (the side away from the user) operated by the fingers.

In order to accommodate users with larger or smaller hands, and to enhance portability, the apparatus is adjustable in size and shape.

The apparatus may be constructed with a fixed or removable stand or support that will allow the device to be set down in an upright position. A cover may be included to protect the keys if the device is to be portable, and the body would be shaped to protect the keys while the device is handled or set down in a flat position.

If the apparatus is to be adapted to a system employing a graphical user interface, then the devices needed to control the pointer would be included, on the front and back, where they could be operated by the fingers or thumbs, in conjunction with the key functionality.

In addition to individual key activation, it is common for key functionality to involve simultaneous activation of several keys at once for control or modifier sequences (such as shift or alt). These keys would be shaped, grouped and positioned so that any one, or several, or all such keys may be operated by one thumb or finger, while the remaining non-modifier keys are operated by the other fingers.

The key functionality of the apparatus maybe implemented by a variety of existing technologies, standard and proprietary, hardware and software, depending on the particular application intended for the apparatus. The most likely embodiments would be as an alphanumeric keyboard that is configured as a self contained portable computer device, a peripheral keyboard for a desktop computer, an accessory keyboard for a PDA type device, an alphanumeric keyboard for a cell phone, electronic pager, or other communications device, or any electronic or mechanical application requiring keyboard functionality in a hand held device.

Since the user cannot see the keys on the back of the apparatus while holding it, those keys are grouped and placed in a standardized configuration, with specific home keys that orient the user to the location of any other keys. In order to help the user find the home keys, their physical location would be marked with slight ridges and given a small nub that could be detected by touch. In addition, the body of the apparatus is shaped and marked to encourage placement of the hands in the home position.

In order to further assist the user in quickly finding the home keys, specific algorithms are included in the software controlling the key functions. These provide visual and/or auditory clues when the home keys are located. These controlling algorithms would also implement a key function lock/unlock that would prevent spurious key activation when the apparatus is set down or handled while it is powered-on.

Off-axis perspective, wire frame rendering.

Figure 6:
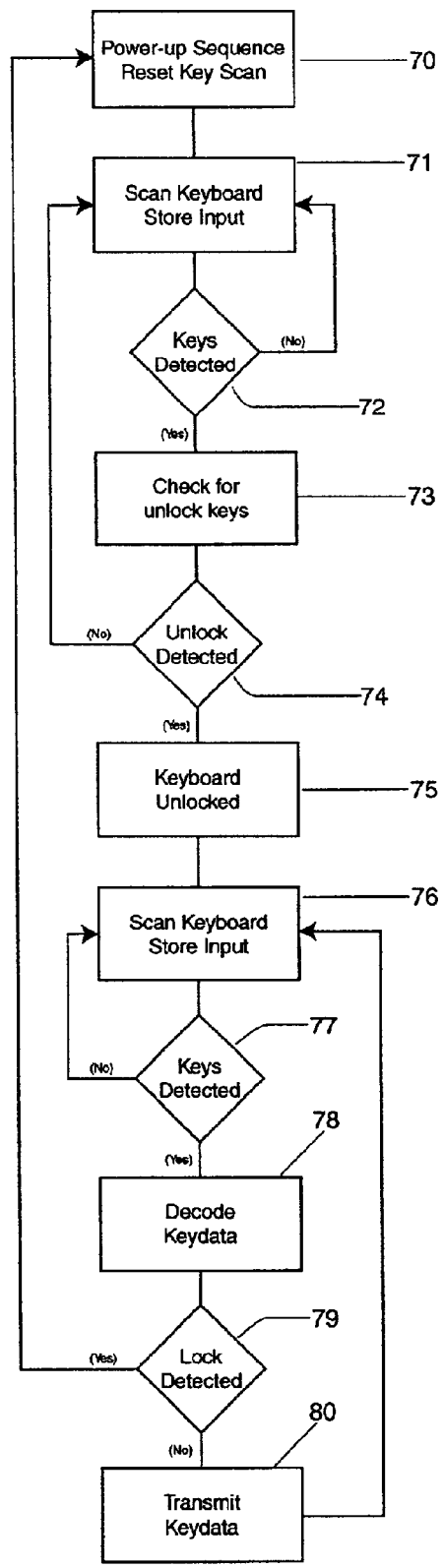

FIG. 6—Diagram of software algorithm.

DETAILED DESCRIPTION OF THE INVENTION

Since the purpose of this invention is to implement improved keyboard functionality in any system that employs such functionality, the number of practical embodiments is considerable.

However, all embodiments would implement the chief novelty of the invention, which is the placement of key functionality on the front and back of the apparatus, with the body of the apparatus being shaped and sized such that the user has the ability to use both of the thumbs, and all of the fingers, at the same time, while holding the apparatus in the hands.

Figure 1:
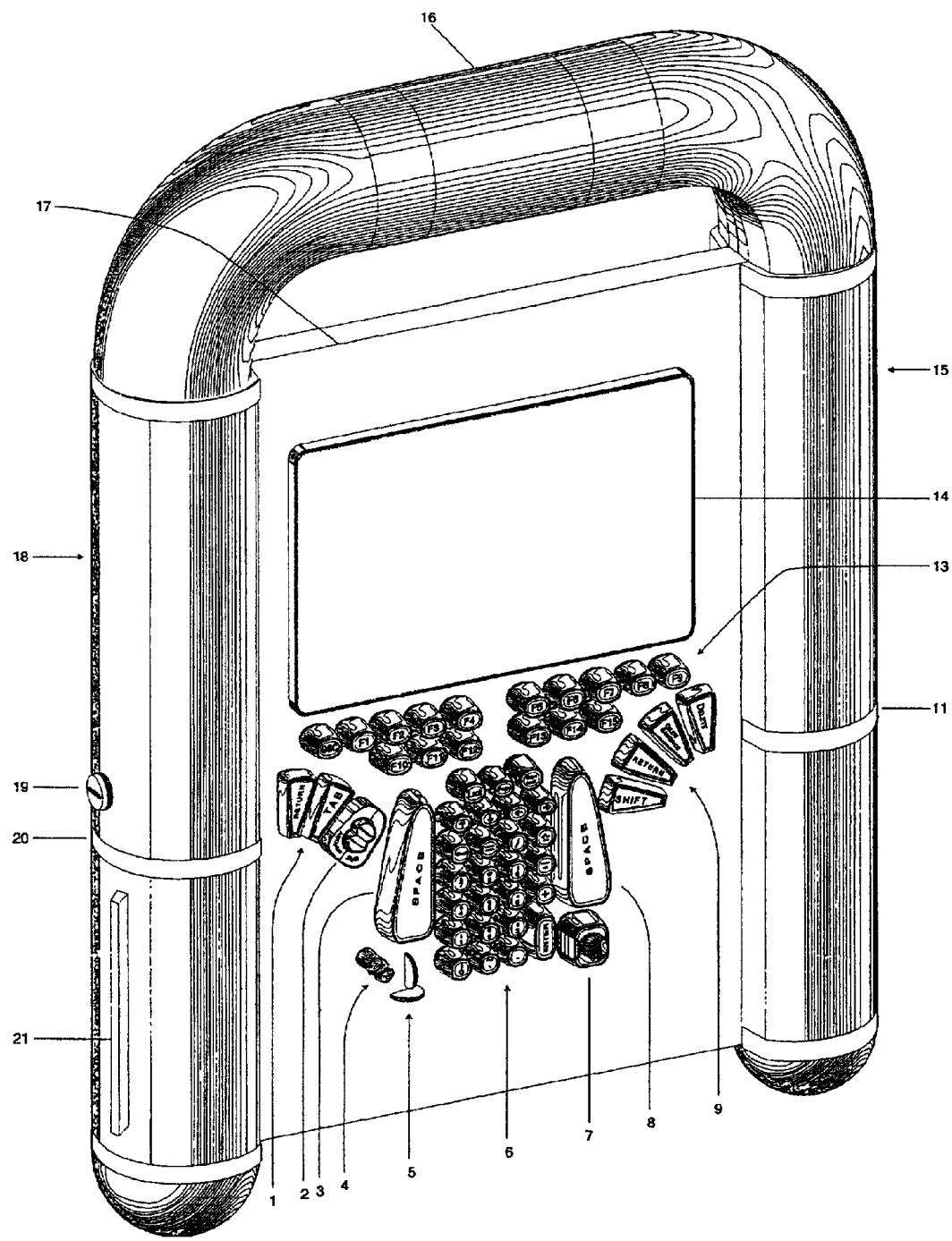
FIG. 1—The front of the invention shown in an off-axis, wire frame rendering.
Figure 4:
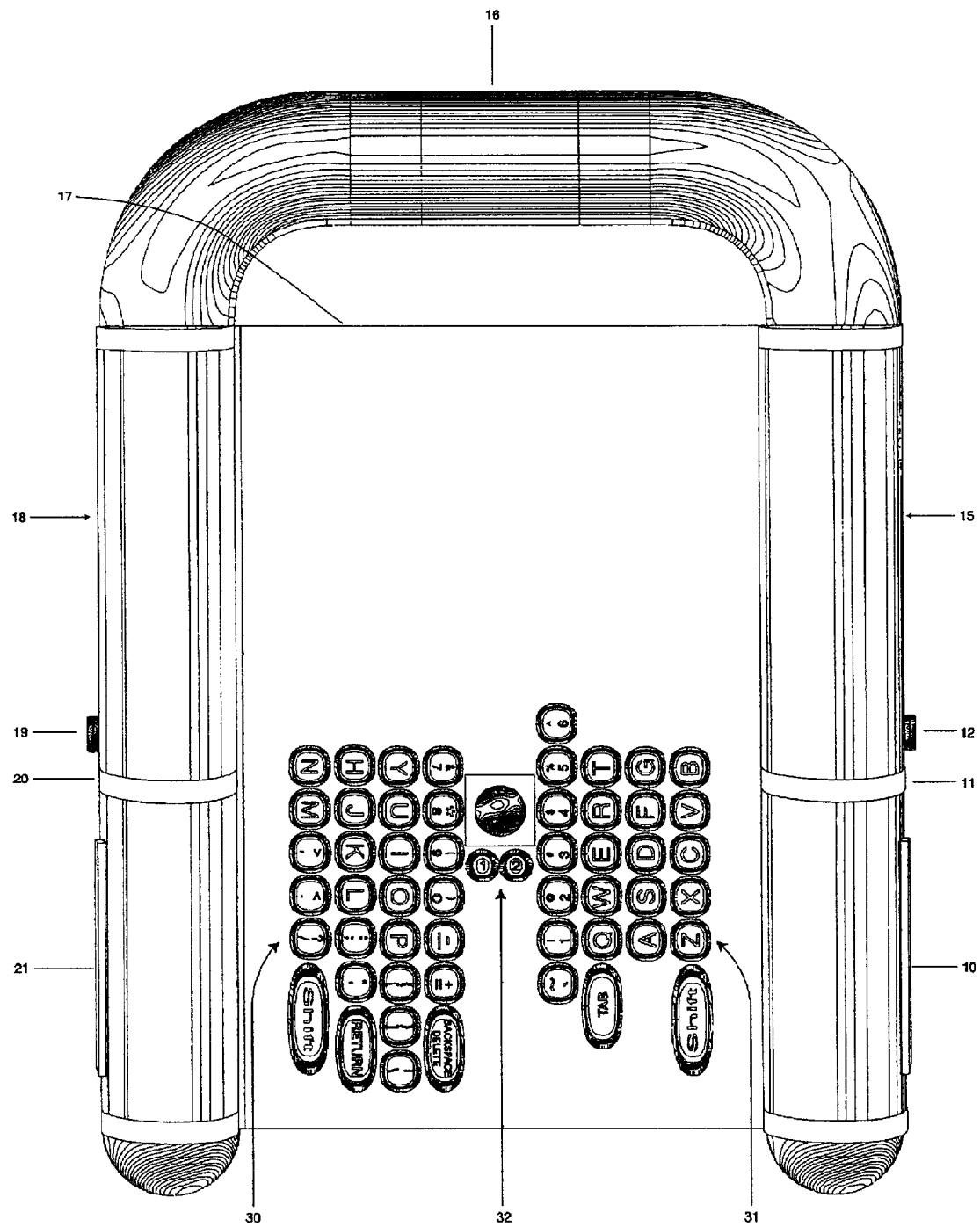
FIG. 4—The back of the invention shown in a flat perspective, wire frame rendering.

Because of the widespread use of keyboards in computer/data-processing systems, the best embodiment of this invention would be as an electronic alphanumeric keyboard, with modifier, control and program functions. In this embodiment, mechanical key switches would be installed. This basic construction would be augmented by the subsequent addition of existing technology, standard and proprietary, hardware and software, in order to realize a variety of computer, and data processing related functions, such as:

1. A keyboard peripheral device. With the embodiment as shown in FIGS. 1 & 4, the addition of standard and proprietary technology allows the device to be connected to a desktop or other computer system as a peripheral keyboard, using wired or cordless technology and protocols, such as infrared, USB, Bluetooth, or other technology. An optional display or indicators for the keyboard would be installed in the area indicated by 14 in FIGS. 1 & 2.

2. A keyboard accessory for a PDA type device. With the embodiment as shown in FIGS. 1 & 4, the inclusion of additional technology allows the device to serve as a detachable keyboard accessory for PDA type devices. Standard and proprietary PDA connectors and hardware would be installed within the location indicated by 14 in FIGS. 1 & 2. These would act as a cradle for the PDA device, providing keyboard functionality when the PDA device is inserted. The body of the apparatus, 17 in FIGS. 1 & 2, would be sized to accommodate the PDA device in the correct orientation.

3. A keyboard controlled portable computer system. With the embodiment as shown in FIGS. 1 & 4, and the inclusion of such technology, standard and proprietary, hardware and software, as would constitute a portable computer system, the apparatus would function similarly to a laptop or slate type portable computer. The advantage here would be the ability of the user to employ full touch-typing techniques without having to set the device down.

The physical structure of the device should be strong and as light as possible, since this is a hand-held device. It should be constructed from durable, lightweight, molded plastics or composite materials, with the added electronic and hardware components being adapted to fit within the hollow spaces. It would be advisable to place as many of these internal components, such as the battery or power supply and as much of the electronic circuitry as possible, toward the bottom of the device so that the unit will be well balanced when held in the users hands and will not be top heavy.

The apparatus is held by pressing the palms of the hands against the handles 18 and 15, at points 21 and 10, (FIGS. 2 & 4), thus leaving the thumbs and fingers free to operate the keys on the front and back, respectively. This position places the user's fingers perpendicular to the keys and keeps the hands wrists and forearms in a straight line. This posture may alleviate the physical stress commonly associated with flat keyboard use.

In order to accommodate different hand sizes, the device is adjustable. The handles, 18 and 15 in FIGS. 2 & 4, would be tubular, such that the body, 17 can slide into and out of the hollow, slotted area where they meet. A telescoping section 16, fits within the tubular sections connecting the handles and allows them to slide in and out, while also serving as a carrying handle. The raised area of the handles also guards the keycaps, when the device is set down on a flat surface.

Set-screws at 19 and 12, (FIGS. 2 & 4) protruding through the handles, 18 and 15 would be embedded in the body, 17. The head of each set-screw 19 and 12, protrudes above the handle and is large enough to turn with the thumb and fingers. Each set-screw is fixed to the handle by a lock-washer. Turning the set-screws will push or pull the handles in or out, allowing for several inches adjustment between the handles and keys. The gap between the handles and the body could be made large enough, such that the handles would cover the keys when they are fully adjusted inward. This would allow the device to be closed up for more convenient portability.

On a standard flat alphanumeric keyboard, the only key assigned to the thumbs is the spacebar. This invention is more useful because numerous keys can be operated by the thumbs. However since the spacebar would be used most frequently, a key for the space character is placed directly beneath the point where each thumb would most naturally fall when holding the device. Two keys are provided, 3 & 8 in FIGS. 1 & 2, for left and right handed users.

Other frequently used keys such as Return, Tab, Shift, Delete and Backspace, are positioned in an arc at 1 and 9 (FIGS. 1 & 2), where they can be reached by rotating the thumbs within a comfortable 90° angle. These keys may be duplicated on the back for added flexibility. Any other keys that may be application specific in a given installation, would be included here as well.

Figure 2:
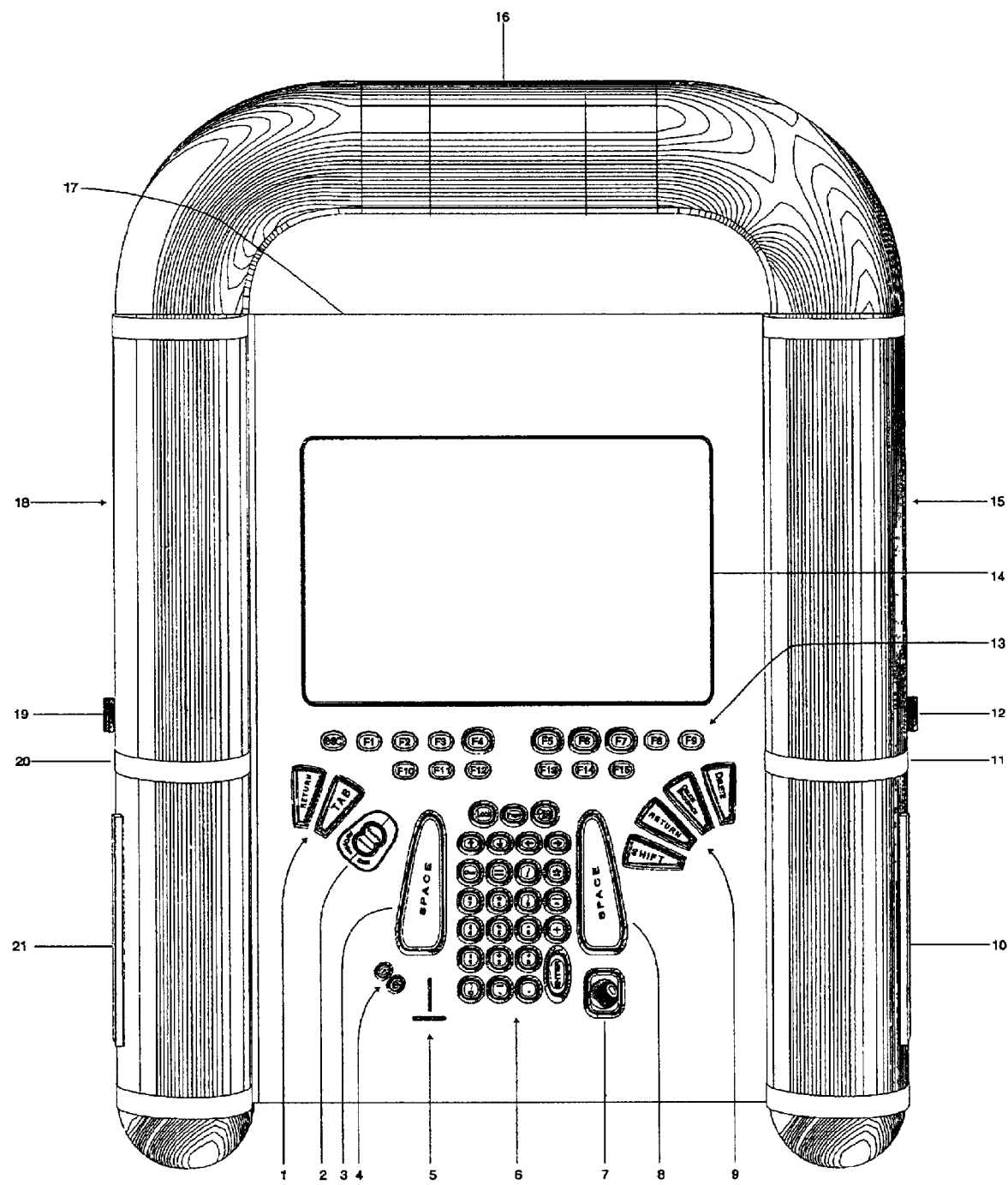
FIG. 2—The front of the invention shown in a flat perspective, wire frame rendering.

Modem computer operating systems make use of programmable function keys. In this embodiment, fifteen function keys, at 13 in FIGS. 1 & 2, are arranged in two groups, for the left and right thumbs. Although these keys are not usually included in the touch-typing system, there is an advantage to the layout set forth in this invention, in that the user can press the function keys without removing his or her fingers from the home key position.

A separate numeric keypad is often included on a standard flat keyboard. In this embodiment, a numeric keypad, at 6 in FIGS. 1 & 2, is placed where it may be operated by either or both of the thumbs. This keypad includes the numbers zero to nine as well as the special characters found in the top row of the QWERTY keyboard layout. These characters are duplicated on both sides of the device for added flexibility. The special characters are typed by using the shift key.

Above the numeric keypad 6, are page and arrow keys for cursor control and scrolling. There is also a caps lock, included for compatibility with standard keyboard use. In this location there is also a keyboard lock key. Pressing this key will reset the keyboard, placing it in lock mode. In this state, the keys would continue to be scanned, but all key data would be ignored by the operating system. In addition, any pointing devices that are present for use with a graphical user interface would also be locked. The device would be unlocked by pressing together, all of the keys designated as the home row. In this embodiment, these would be A,S,D,F and J,K,L, and; (semicolon), which corresponds to the order of the keys used in the OWERTY layout. This is also useful in helping the user to quickly locate the home row.

Figure 5:
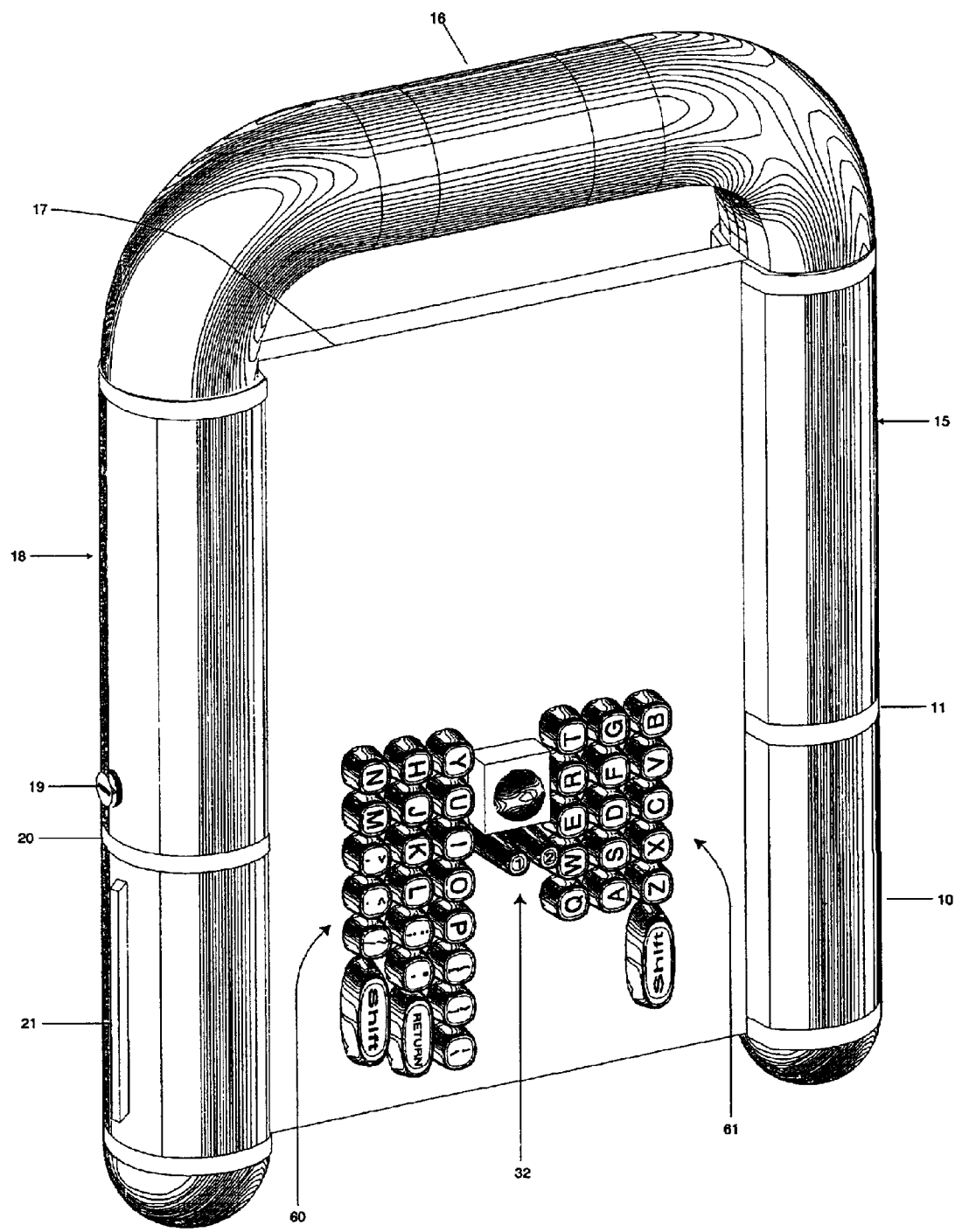
FIG. 5—The back of the invention showing an alternate embodiment.

Small switches are embedded in the handles at 21 and 10 (FIGS. 2, 4 & 5). These would be normally closed contact switches. When holding the device for use, the switches would be pressed, leaving the contacts open. These switches would be equivalent in function to the keyboard lock key. Releasing the handles would close the contacts, putting the keyboard into lock mode. This would allow the user to handle the device or set the device down while it is powered on, without having extraneous keystrokes entered.

In addition to alphanumeric keys, modem computer operating systems make use of additional modifier keys, such as control, command, alt/option, etc. Use of these special keys involves pressing and holding one or several of them while tapping a letter or number key. On a typical standard flat keyboard, the special modifier keys are placed adjacent to the alpha keys, where they cannot be employed using standard touch-typing techniques.

Figure 3:
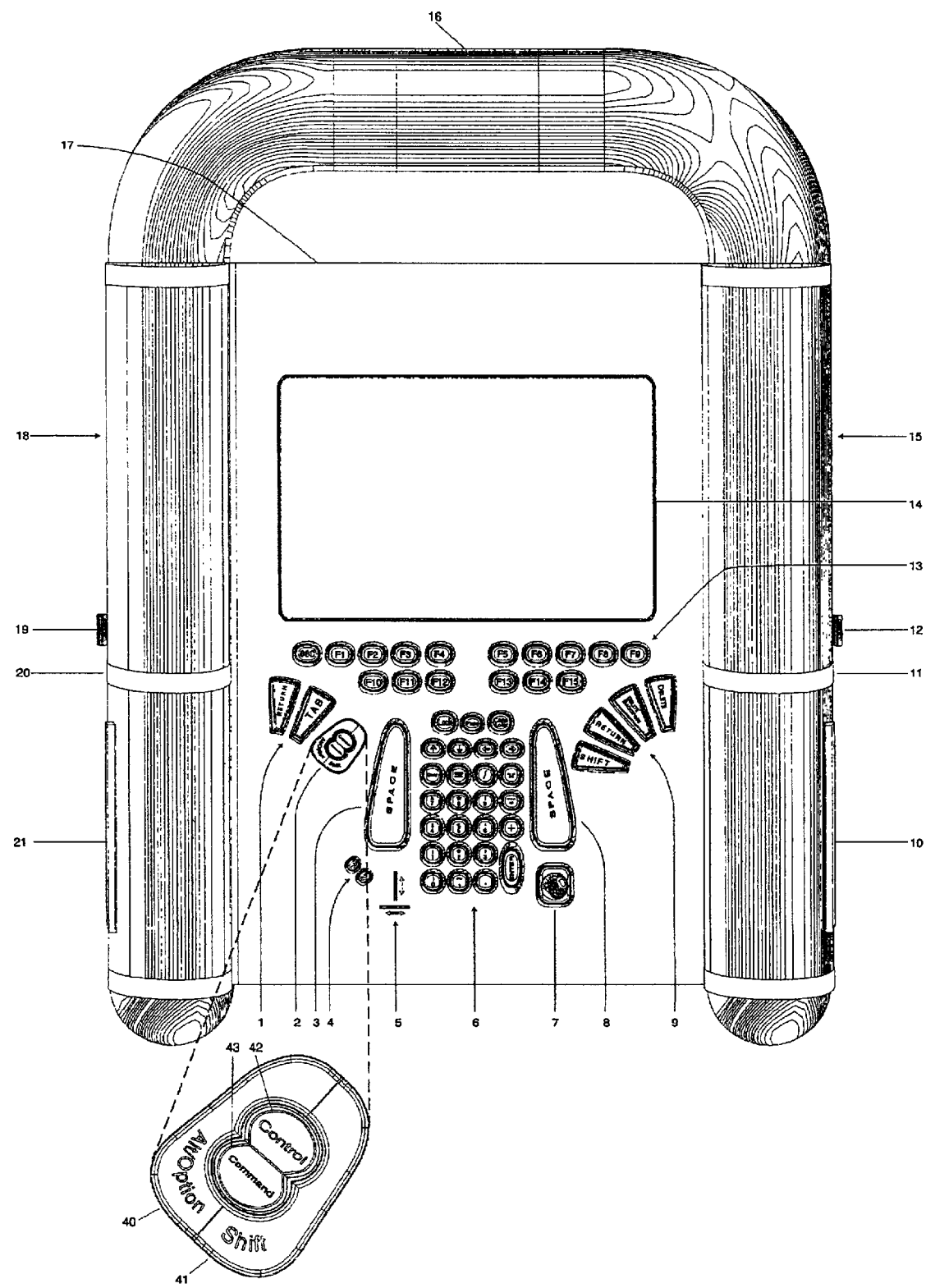
FIG. 3—A partially exploded detail view of the front of the invention. wire frame rendering.

In this embodiment, these modifier keys (at 2 in FIGS. 1 & 2) are shaped and clustered such that any one, or several, (or all) can be operated by one thumb. A magnified view is presented in FIG. 3. The alt/option key (40) and a duplicate shift key (41) are in a split configuration that surrounds the command and control keys (43 & 42). In this way, any individual key can be pressed with the tip of the thumb, while any combination of alt/option, shift, command or control can be accomplished by pressing along the edges where the desired keys meet.

This embodiment of the invention has space for a display at 14 in FIGS. 1 & 2. An LCD, plasma screen, or other type of existing standard and proprietary technology would be required to support the functionality of a portable computer system.

Since the operating software of many contemporary computer systems employs a graphical user interface (GUI), some type of pointing device is required within these systems. This could be a mouse type controller, track ball, touch pad, or mini joystick. In order for this embodiment of the invention to support this functionality, a track ball (7 in FIGS. 1 & 2) is installed below the right space bar. This would be operated by the right thumb, while any associated buttons (4), would be located under the left space-bar to be operated by the left thumb. Scroll wheels (5), for vertical and horizontal scrolling would be located here as well. A duplicate controller for the graphical user interface is installed on the back, (32 in FIGS. 4 & 5), so that the user has the option of operating it with the fingertips.

In this embodiment, the keys on the back of the apparatus are configured such that a person familiar with a OWERTY style flat keyboard would be able to adapt the same touch typing fingering to the new device. The principle alphanumeric keys, 30 and 31 are located on the back (FIG. 4). The keys normally typed with the left hand are grouped in rows parallel to the right side of the device (as seen from the back) and the keys normally typed with the right hand are grouped in rows parallel to the left side of the device. The order of the keys reflects the standard QWERTY layout. The alternative Dvorak layout, or other international keyboard standards may be implemented here, or may be made selectable in the software controlling the keys. The caps lock key is not included in order to eliminate the possibility that the user might press it in error.

There is enough space on the back of the apparatus to install standard size keys. This would be approximately 18 mm center to center between keys within each row, and 21 mm between the rows, as specified in ANSI standard HFS 100-1988. It is not necessary for the rows of keys to be offset, as is the case on a flat keyboard. Using standard size keys is desirable for effective touch-typing.

In order to perform touch typing the user must orient the fingers on a fixed set of keys called the home row. These keys are F,D,S,A, for the left hand, and J,K,L,; (semicolon) for the right hand, in the OWERTY layout. Since the user cannot see the back of the invention, the home row of keys needs to be ridged and dimpled slightly so they can be distinguished by the way they feel. In addition, a pair of markings 11 & 20 (in FIGS. 1, 2, 4 & 5), is placed on the handles just above the position of the index fingers. A means of establishing contact with the home row of keys is also implemented in software.

Once the user has grasped the device, and located the keys in the home row, typing would proceed with the same touch-typing finger movements learned on a standard flat keyboard. The thumbs would be used to operate the space bar, 3 or 4 (FIGS. 1 & 2), striking downward with essentially the same movement used on a flat keyboard.

It may be desirable to offer users a slightly simplified keyboard, where the numeric and special character keys on the back are omitted (FIG. 5), since these are duplicated on the front, 6 (FIGS. 1 & 2). In this case, the sets of keys 60 & 61 would only include the characters found in the first three rows of a flat OWERTY keyboard.

In order to operate as a keyboard, this invention must encode and transmit the key data. In this embodiment, this function would be served by almost any type of proprietary or standard electronic scanning matrix encoder. The only requirement is that the matrix allow for at least eight key switches to be detected together. A generic arrangement would connect each key switch to the matrix through a resistor/diode combination. This would permit any number of keys to be pressed at one time. An 8×16 matrix would provide for 128 keys which would be enough for most keyboard applications. The addition of a small capacitor to the circuit at each switch would prevent any electrical noise generated by the switch contacts from being interpreted as multiple keystrokes.

A simple binary clock circuit would count repeatedly from zero to 128, at a sufficient rate to allow for a complete scan of the keyboard within at least one thirtieth of a second. Each clock pulse would trigger logic circuits connected to the matrix. These would step through each row and column of the matrix. Any keys pressed on the keyboard would be detected by the current change through the resistor/diode combination. In this way, as the clock steps through the matrix, each key pressed is identified by the number it occupies in the matrix. No switch would be connected to the point corresponding to key zero. This would be reserved to identify when a scan has started.

Any further requirements for scanning and coding the keys would be accomplished by additional standard and proprietary hardware and software, as dictated by the installed operating system. The output from the key circuitry would be interpreted using lookup tables and user preference files, to establish the correct key data or control sequence.

One specific requirement, a software interface typically known as a device driver, would be needed for communication between the keyboard and additional system components (whether these components are installed internally within the apparatus, or operated remotely, it the apparatus is configured with wireless devices). This device driver would be coded according to the standard protocols for the installed operating system, and would reside in firmware as part of the keyboard circuitry or would be a software module, to be loaded and used as needed by the operating system.

One of the features contemplated for this invention is a means of both locking and unlocking the keyboard as needed, as well as helping the user locate the home row of keys. In this embodiment, an algorithm that is intended to be incorporated within the code of the device driver accomplishes this function. This would affect the operation of the apparatus by locking the keyboard, as well as any installed pointer devices for a GUI, during power-up or when the lock button us pressed, or when the handles are released. The apparatus would be unlocked when the user grasps the handles and presses all of the home row keys at the same time. This algorithm is illustrated in FIG. 6.

Power-Up Sequence/Reset, 70. During initial power-up, the keyboard driver sends a code appropriate to the installed operating system, indicating that the keyboard is locked. In this mode, no key data is processed at the system level and any pointer devices (such as mouse controllers) that are present on the apparatus should be ignored. Once power-up is complete, processing proceeds to the next step.

Scan Keyboard/Store Input, 71. Buffers and variables are cleared and reset, and a signal is sent to the scanning circuitry in the keyboard to reset the scan to zero (the starting point). Then each node in the keyboard matrix is examined as the circuit cycles through the key switches. When a key down is detected, the number corresponding to the key is stored in an array or stack and a pointer to the stack is incremented. When matrix node zero is reached, a full scan has been completed, and the program advances to the next step.

Keys Detected, 72. If the key number stack is empty (stack pointer is zero), then the program transfers back to 71. The keyboard remains locked and looping continues indefinitely as long as no keys are detected. If the key number stack is not empty (keys detected), then the program branches to the next module.

Check for unlock keys, 73. The key number stack is popped by decrementing the stack pointer, and each entry in the stack is compared to a list of unlock numbers (corresponding to the eight home row keys). For each match found, a variable is incremented. If a key number is detected that is not on the list (extraneous key pressed) the variable is decremented. If the number of either of the two normally closed switches in the handles is detected, the variable is decremented by eight. When the key stack pointer is decremented to zero, the algorithm proceeds to step 74.

Unlock Detected, 74. If the variable in step 73 is equal to eight, then all of the unlock keys have been pressed and processing advances to step 75. If not, processing branches back to 71, where keyboard scanning continues.

Keyboard unlocked, 75. The user is prompted with audio or visual feedback (a beep, flashing light or other signal) Indicating that the unlock sequence was successful, and that the user is correctly covering the home row of keys. Any GUI pointer devices should be activated, as appropriate to their respective drivers. Since the user will have pressed the home row of keys to unlock the keyboard, the driver will pause at this step and continue to scan the key matrix until all keys have been released (no keys detected). The program then advances to module 76.

Scan Keyboard/Store Input, 76. Buffers, pointers and variables are cleared and reset. The key switch matrix is scanned again, as in module 71. Each node in the keyboard matrix is examined as the circuit cycles through the key switches. When a key is detected, its number is added to the key data stack. At the end of the scan, processing advances to the next step.

Keys Detected, 77. If the key number stack is empty (stack pointer is zero), then the program transfers back to 76 and another scan is done. Looping continues indefinitely as long as no keys are detected. If the key number stack is not empty (keys detected), then the program branches to the next module.

Decode key-data 78. In this module, the data in the key stack is examined by decrementing the pointer. If a lock key number is found, a variable is flagged. Key number entries are added to an output buffer, and processing advances to the next step.

Lock detected, 79. If the variable corresponding to the lock numbers is flagged, control branches back to the beginning (70), where the reset and lock sequence is performed. The keyboard is locked, and the driver once again proceeds to scan for the unlock keys. If the lock variable is not flagged, control transfers to 80.

Transmit data, 80. Data in the output buffer is transmitted to the operating system for further processing. The operating system will use look-up tables and support files to determine corresponding values for the key numbers. These values would be ASCII codes, system codes or other data as appropriate to the installed operating system and applications. The look-up tables would be stored as system and user preference files, which would also allow for alternate or international keyboard layouts.

Scan Keyboard/Store Input, 76. The keyboard driver will stop and remain in module 80 while the operating system interprets the data from the current keyboard scan. By examining key numbers from successive scans, the operating system determines which keys have been pressed, are being held or released, and what values or functions these keys represent. When processing is complete, the operating system signals the driver and control returns to the scanning algorithm at module 76.

Whereas this invention is here illustrated and described with reference to embodiments that are presently contemplated as the best mode of carrying out such invention in actual practice, it is to be understood that various changes may be made in adapting the invention to different embodiments without departing from the broader inventive concepts disclosed therein and comprehended by the claims that follow.

What is claimed is:

1. A software controller, of a type known as a device driver, which scans, detects, interprets and encodes data from the key switches of an electronic keyboard device, and transmits said data to the operating system in a computer or other data processing or communications device, wherein such driver is programmed with algorithms to perform the process, whereby;

the key-data is examined before it is relayed to the operating system, specifically to detect whether switches in the handles have been released, or whether a switch designated lock/reset on the front of the apparatus has been pressed, with the effect that, at such time, no further data will be transmitted, effectively locking the keyboard, until the keys designated as the home row have been pressed together simultaneously, and released while the device is held in the hands, thereby resetting and unlocking the keyboard, and said software shall include the instruction to place the keyboard in its locked state during power-up and said software shall include an interface for any devices that may be included in the computer that function as the pointers in a graphical user interface, to block data from these devices, during the time that the keyboard is locked.

* * * * *